(12) United States Patent
Fellhauer et al.

(10) Patent No.: US 10,693,551 B2
(45) Date of Patent: Jun. 23, 2020

(54) COMMUNICATION DEVICE AND METHOD USING VIRTUAL SECTOR FORMING

(71) Applicant: Sony Corporation, Tokyo (JP)

(72) Inventors: Felix Fellhauer, Stuttgart (DE); Sven Seiler, Stuttgart (DE); Dana Ciochina, Stuttgart (DE); Nabil Sven Loghin, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/489,356

(22) PCT Filed: Mar. 16, 2018

(86) PCT No.: PCT/EP2018/056708
§ 371 (c)(1),
(2) Date: Aug. 28, 2019

(87) PCT Pub. No.: WO2018/167284
PCT Pub. Date: Sep. 20, 2018

(65) Prior Publication Data
US 2020/0007219 A1    Jan. 2, 2020

(30) Foreign Application Priority Data
Mar. 17, 2017 (EP) ..................... 17161649

(51) Int. Cl.
*H04B 7/02* (2018.01)
*H04B 7/06* (2006.01)
(Continued)

(52) U.S. Cl.
CPC .......... *H04B 7/0695* (2013.01); *H04B 7/046* (2013.01); *H04B 7/0408* (2013.01);
(Continued)

(58) Field of Classification Search
CPC .... H04B 7/0695; H04B 7/088; H04B 7/0617; H04B 7/0491; H04B 7/0482; H04B 7/046; H04B 7/0408; H04B 7/043; H04W 16/28
See application file for complete search history.

(56) References Cited

U.S. PATENT DOCUMENTS

| 7,120,468 | B1* | 10/2006 | Wilhoyte | H01Q 3/2605 |
| | | | | 455/562.1 |
| 2008/0009321 | A1* | 1/2008 | Sayeed | H01Q 3/2605 |
| | | | | 455/562.1 |

(Continued)

FOREIGN PATENT DOCUMENTS

WO    2016/184214 A1    11/2016

OTHER PUBLICATIONS

International Search Report and Written Opinion dated May 30, 2018 for PCT/EP2018/056708 filed on Mar. 16, 2018, 11 pages.
(Continued)

*Primary Examiner* — Andrew Wendell
(74) *Attorney, Agent, or Firm* — Xsensus LLP

(57) ABSTRACT

A communication device for RF-based communication with another communication device comprises antenna circuitry configured to transmit and receive RF signals, and beamforming circuitry configured to perform beamforming and to carry out a beam training procedure for finding a beam for use in transmitting and/or receiving RF signals and/or for channel estimation. The beamforming training procedure comprises at least two stages during which training signals are transmitted using different beams, wherein first beams used in a first stage have a larger beam sector than second beams used in a second stage and wherein the second beams
(Continued)

are selected by forming a virtual best sector based on an evaluation of a predetermined metric obtained for the first beams in the first stage.

19 Claims, 7 Drawing Sheets

(51) Int. Cl.
    *H04B 7/0408* (2017.01)
    *H04B 7/0456* (2017.01)
    *H04B 7/0491* (2017.01)
    *H04B 7/08* (2006.01)

(52) U.S. Cl.
    CPC ......... *H04B 7/0482* (2013.01); *H04B 7/0491* (2013.01); *H04B 7/0617* (2013.01); *H04B 7/088* (2013.01)

(56) References Cited

U.S. PATENT DOCUMENTS

| | | | | |
|---|---|---|---|---|
| 2009/0232240 A1* | 9/2009 | Lakkis | ................ | H04B 7/0491 375/260 |
| 2012/0027111 A1* | 2/2012 | Vook | .................... | H04B 7/0452 375/267 |
| 2014/0307654 A1* | 10/2014 | Kim | .................... | H04B 7/0617 370/329 |
| 2015/0333811 A1* | 11/2015 | Yu | ....................... | H04B 7/0617 370/329 |
| 2015/0341095 A1* | 11/2015 | Yu | ....................... | H04B 7/0619 370/252 |
| 2015/0341105 A1 | 11/2015 | Yu et al. | | |
| 2016/0065284 A1* | 3/2016 | Yu | ........................ | H04W 16/28 370/329 |
| 2016/0119910 A1 | 4/2016 | Krzymien et al. | | |
| 2018/0006696 A1* | 1/2018 | Yue | ....................... | H04B 7/0486 |

OTHER PUBLICATIONS

IEEE, "Part 11: Wireless LAN Medium Access Control (MAC) and Physical Layer (PHY) Specifications", Amendment 3: Enhancements for Very High Throughput in the 60 GHz Band, IEEE Std 802.11, Dec. 28, 2012, pp. 1-598.
IEEE, "Wireless Medium Access Control (MAC) and Physical Layer (PHY) Specifications for High Rate Wireless Personal Area Networks (WPANs)", IEEE Std 802.15.3c, Oct. 12, 2009, pp. 1-187.
Heath JR. et al., "An Overview of Signal Processing Techniques for Millimeter Wave MIMO Systems", Dec. 9, 2015, pp. 1-41.
Alkhateeb et al., "Channel Estimation and Hybrid Precoding for Millimeter Wave Cellular Systems", IEEE Journal Of Selected Topics in Signal Processing, vol. 8, No. 5, Oct. 2014, pp. 831-846.
Wang et al., "Beam Codebook Based Beamforming Protocol for Multi-Gbps Millimeter-Wave WPAN Systems", 2009, 6 pages.
IEEE, "Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE P802.11ay/D0.2, Jan. 2017, pp. 1-179.
Xiao et al., "Hierarchical Codebook Design for Beamforming Training in Millimeter-Wave Communication", IEEE Transactions on Wireless Communications, vol. X, No. X, XXX 20XX, pp. 1-13.
Ho et al., "MIMO Beamforming in Millimeter-Wave Directional Wi-Fi", pp. 1-10.
IEEE, "Multi-Stage, Multi-Resolution Beamforming Training for 802.11ay" IEEE 802.11-16/xxxxr0, Sep. 12, 2016, pp. 1-11.

* cited by examiner

COMMUNICATION DEVICE AND METHOD USING VIRTUAL SECTOR FORMING

CROSS-REFERENCE TO RELATED APPLICATIONS

The present application is based on PCT filing PCT/EP2018/056708, filed Mar. 16, 2018, and claims priority to EP 17161649.3, filed Mar. 17, 2017, the entire contents of each are incorporated herein by reference. This application is also related to U.S. Ser. Nos. 16/343,409 and 16/343,416, the entire contents of each are incorporated herein by reference.

BACKGROUND

Field of the Disclosure

The present disclosure relates to a communication device and method for RF-based communication with another communication device.

Description of Related Art

Future wireless communication systems like WLAN will benefit from huge available bandwidths in mmWave spectrum (e.g., in 60 GHz band), as these frequencies are less congested than legacy bands (2 GHz and 5 GHz) and offer several benefits like smaller antenna sizes, very high channel bandwidth, increased frequency reuse, etc. when used for communication in unlicensed bands. However, new technical challenges have to be solved in order to make these bands usable for consumer grade communication devices like cellphones and laptops.

One of these challenges is overcoming the comparably large path loss in mmWave frequencies. Therefore, beam forming techniques and steerable directive antennas will be employed in upcoming WLAN standards like IEEE 802.11ad (single spatial stream per user) and IEEE 802.11ay (multiple spatial streams (Hybrid MIMO) and multiple users). Controlling and coordinating these interactive antennas is one of the key aspects of transmitter and receiver technology in this context.

With the goal to find antenna configurations that maximize the achievable throughput for a link between an access point (AP) and station (STA), the tradeoff between the time it takes to establish the communication link and achieved data rate once the ink is established is of great interest. This can become quite challenging for devices equipped with large antenna arrays due to the exponentially increasing (vs. number of sub-antenna elements) number of different discrete spatial beams that can be transmitted/received. This holds especially for hybrid MIMO configurations featuring multiple antenna arrays at transmitter and receiver.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a communication device and method that enable finding beams suitable for RF communication with another communication device with less computational complexity and in a more efficient manner. It is a further object to provide a corresponding computer program and a non-transitory computer-readable recording medium for implementing the communication method.

According to an aspect there is provided a communication device for RF-based communication with another communication device, said communication device comprising
  antenna circuitry configured to transmit and receive RF signals, and
  beamforming circuitry configured to perform beamforming and to carry out a beam training procedure for finding a beam for use in transmitting and/or receiving RF signals and/or for channel estimation, said beamforming training procedure comprising at least two stages during which training signals are transmitted using different beams, wherein first beams used in a first stage have a larger beam sector than second beams used in a second stage and wherein the second beams are selected by forming a virtual best sector based on an evaluation of a predetermined metric obtained for the first beams in the first stage.

According to a further aspect there is provided a corresponding communication method.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed communication method, the disclosed computer program and the disclosed computer-readable recording medium have similar and/or identical further embodiments as the claimed communication device and as defined in the dependent claims and/or disclosed herein.

One of the aspects of the disclosure is to reduce the number of beam training iterations (the number of discrete beams that are evaluated) while maintaining a comparable performance in terms of achievable data rate. For this purpose antenna circuitry is used that can form beams of variable (spatial) width (i.e. having a sensitivity region of variable size) that are then tested using advanced methods instead of testing the narrowest beams the antenna circuitry can form.

Alternatively to forming variable beam widths, e.g. broader beams for a coarse search stage, several beams may also be generated simultaneously, which in total cover effectively a larger sector. This can e.g. be achieved by splitting up a single antenna array into multiple, possibly equally sized, antenna arrays that each use a linear antenna weight vector to form beams in different spatial directions.

By the disclosed aspects complexity for finding the best beams through beamforming can be substantially reduced while maintaining comparable performance over an exhaustive search method.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
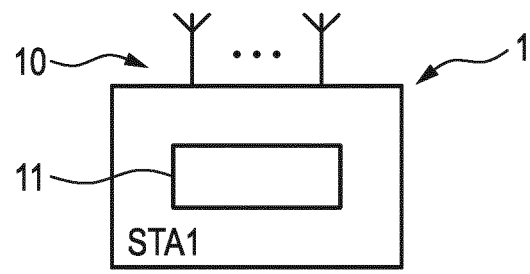
FIG. 1 shows a schematic diagram of a communication system including first and second communication devices.
Figure 1:
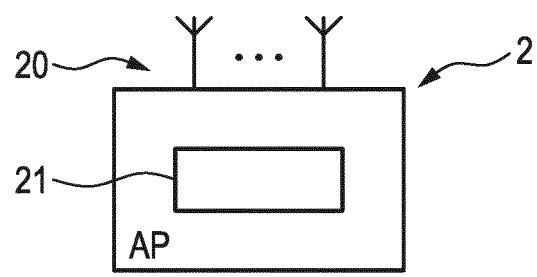
Figure 1:
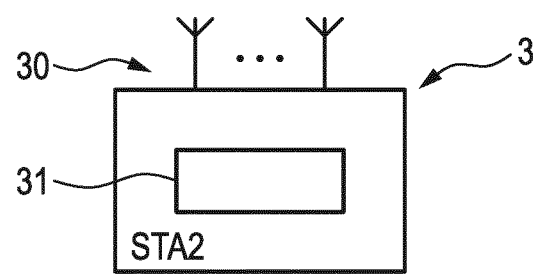

Referring now to the drawings, wherein like reference numerals designate identical or corresponding parts throughout the several views, FIG. 1 shows a schematic diagram of a communication system including first communication devices 1, 3 (stations STA1, STA2) and a second communication device 2 (an access point AP). Each of the first communication devices 1, 3 comprises an antenna circuitry (sometimes also called antenna unit) 10, 30 configured to transmit and receive RF signals, and a beamforming circuitry (sometimes also called beamforming unit) 11, 31 configured to perform beamforming and to control its antenna circuitry 10, 30. Similarly, the second communication devices 2 comprises an antenna circuitry 20 configured to transmit and receive RF signals, and a beamforming circuitry 21 configured to perform beamforming and to control its antenna circuitry 20. More details of their operation will be described below.

Communication systems in the 60 GHz frequency range suffer from strong free space path loss $a_{fs}$ which increases with frequency:

$$a_{fs} \text{ [dB]} = -147.55 \text{ dB} + 20 \log_{10} f + 20 \log_{10} d$$

This formula above gives the free space path loss in dB as a function of frequency $f$ and link distance $d$. Apparently, a 60 GHz communication system has roughly 22 dB higher attenuation compared to a communication system operating at 5 GHz.

To overcome the increased path loss, 60 GHz or any mmWave communication system employs beamforming, i.e. transmitter and/or receiver feature an antenna circuitry, e.g. a steerable phased-array antenna (PAA), which can form directive beams towards the another communication device. Such beams have typically a high directivity and are spatially very narrow. The directivity in main direction increases with the number of antenna elements per PAA. In contrast, the half-power beam width (HPBW) defines the spatial width of a pattern decreases with increasing number of antennas. Thus, the more antennas per PAA, the higher the directivity and the smaller the HPBW. In order to make use of the PAA directivity for communications, beam alignment is crucial and of high importance for mmWave communication systems.

In the following description of exemplary embodiments, the terminology of WLAN system will be used, i.e. there is a station (STA) and a single central network access point (AP) or personal basic service set control point (PCP), i.e. the term AP as used herein shall be understood generally to reference either an AP or a PCP (also referenced as PCT/AP sometimes in WLAN terminology). Both intend to exchange data wirelessly in e.g. the 60 GHz (mmWave) frequency band. However, this disclosure is not limited to this frequency band, but is applicable to any other communication system employing beamforming such as mmWave LTE for example.

This disclosure particularly addresses the beamforming phase, in particular the beamforming training phase or the association phase (also called association beamforming training phase) during which STAs try to find good beams for data transmission to an AP or another STA. It is assumed that the used antennas in a setup for mmWave communication systems are capable to transmit and receive signals not only using beams with the smallest possible beam width but using beams with variable width.

Usually it is intended to send and receive signals using the smallest beam width an antenna can provide, because of the advantages in directivity and suppression of interference signals. When using PAAs to implement these steerable antennas consisting of N×M antenna elements the narrowest beam width in each direction can be reached by using all antenna elements with a linear (phase over index of sub antennas) antenna weight vector (AWV) or by using a parabolic AWV, in case the distant of a Line of Sight (LoS) connection is known (focus point placed on receiver side). Using the minimum beam width of such a PAA, the maximum gain in dB compared to an isotropic radiator is $g_{dBi} \approx 10 \log_{10}(M \times N)$ [1]. The beam width is defined as the angular range in that the gain does not fall below half of the maximum antenna gain ("3 dB beamwidth").

One major drawback when using large antenna arrays for communications is the huge effort to find the best beam combination at transmitter and receiver (especially for multiple antenna arrays in Hybrid-MIMO configurations) that maximizes a certain metric like link throughput (capacity) or coverage. This procedure is usually called "beam training".

The following concepts describe how the PAAs can be used to form beams of variable width (or, more precisely, with sensitivity regions of variable size, e.g. no single or contiguous beam, but several narrower non-contiguous beams) and how these beams can be exploited to reduce complexity of the beam training procedure. In general, several stages of beam training can be performed with variable beamwidth for each stage, e.g., starting with coarse sector search, then using refined search only in the best sector(s) with finer beam widths. Such stages can be visualized by a search tree, where each branch corresponds to a particular search stage, using a particular beam width.

It should be noted that this disclosure describes methods to improve beam training, i.e., finding optimum communication links (capacity, received signal strength, . . . ) with limited search complexity. However, the disclosed methods can also be applied to the problem of estimating the channel, e.g., from each subarray antenna element (TX side) to each subarray element (RX side), which is a problem due to the limited number of RF-chains available in the considered use cases. Thus, a coarse spatial channel estimation may proceed subsequent finer spatial channel estimation stages. For mmWave channels, the (full) channel state information is equivalent to the knowledge of the geometrical properties of TX- and RX antenna arrays and parameters of the propagation paths between TX and RX. A (semi-)closed form of the (full) channel state information may allow one-shot computation of both analog and digital beam forming.

When performing the conventional beam training procedure according to the concept of a static codebook tree, an Initiator (e.g. a first communication device, such as a station) sends a beam training request to a Responder (e.g. a second communication device, such as an access point). In the first stage, the Responder then sends training sequences using beams of the codebook with the widest beam width available. During this period the Initiator is listening, e.g., using a quasi-omnidirectional antenna/antenna configuration, as is done in the SLS (sector level sweep) stage described in IEEE802.11ad. After the Responder swept through all entries of the codebook, the Initiator sends back beam quality scores to the Responder.

Figure 2A:
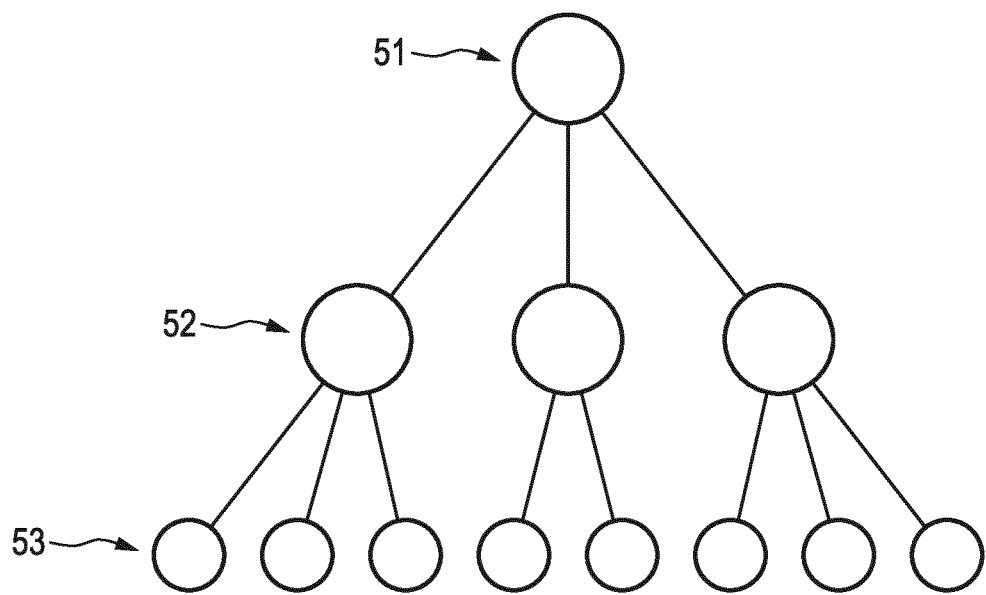
FIG. 2 shows a conventional static codebook tree and an illustration of the sectors used for training in two subsequent stages according to this static codebook tree.
Figure 2B:
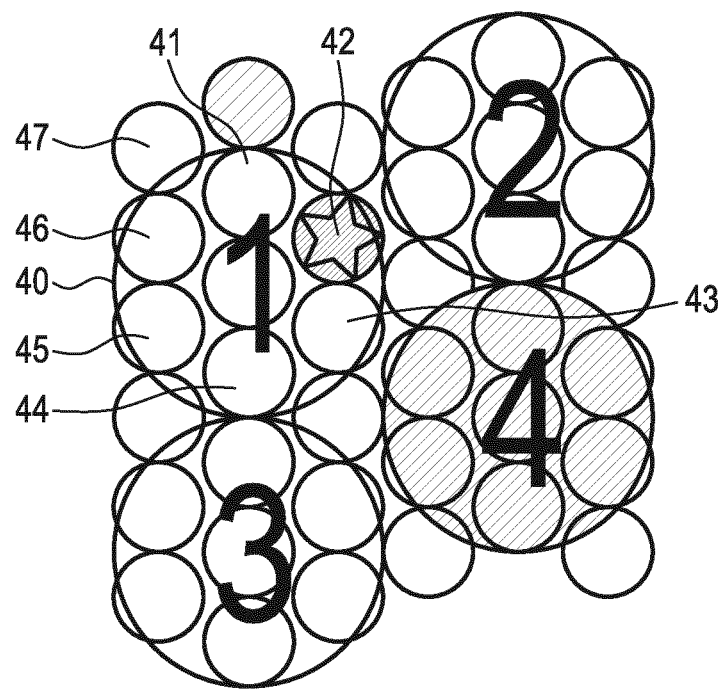

The Responder then employs a static table that maps each entry of a coarse codebook entry to a subset of entries in the next finer codebook. This table can be visualized as a tree structure, as illustrated in FIG. 2A. FIG. 2B illustrates the step-wise search according to this codebook tree. In the first coarse search stage S1, the large sector 1, indicated by reference sign 40, has been identified as strongest sector, so the refined search in the second stage S2 will be concentrated only on this strongest sector 40 (or subsequently the second strongest one, or even considering more candidates). In the limited search inside sector 1 (40), only seven narrow sectors 41-47 are further tested (instead of testing all available narrow sectors). The narrow sector 42 indicates the sector with the global optimum, which can be found with limited complexity. During the next stage S3 the Responder then uses the next finer codebook to perform a sweep through the sectors again, which is followed by a feedback of beam quality scores from the Initiator. This procedure is repeated until the finest possible codebook is reached at Responder side.

To train the beams at the Initiator side, the same procedure is repeated vice versa with the former Initiator transmitting training sequences using the codebooks starting with the widest beam width towards the codebook with most narrow beams.

In this approach the codebook tree is traversed systematically in the direction from coarse to fine beams only and the interconnections between the codebook entries are assumed to be static.

Generally, the order "coarse to narrow" does not necessarily have to be kept. Alternatively, the beam training algorithm may detect that the search in a later stage of the tree (narrow sector) does not offer new good candidates (small resulting metric, like capacity), thus it may want to go back to the previous stage(s), investigating the second (or third, . . . ) best candidate at these coarser beam width stages.

To further increase the overall performance in terms of reduction of necessary training procedures as well as reduction of the probability to miss the globally best beam in the finest codebook, the following alternative beam training procedure is proposed according to this disclosure. In this alternative approach, a dynamic codebook tree using virtual sectors is derived while executing the beam training procedure. The term "virtual sector" shall be understood as a search sector for refined search with narrower beams, which is not necessarily covered by a coarse sector from a previous stage. Instead, it might be any region (also not necessarily contiguous), formed dynamically from the feedback information from a previous stage. This virtual sector is then used as root node for the next round to define the subset of beams to be tested next. This subset can for example be constituted by any contiguous or non-contiguous region of beams covered by the virtual sector.

Figure 3:
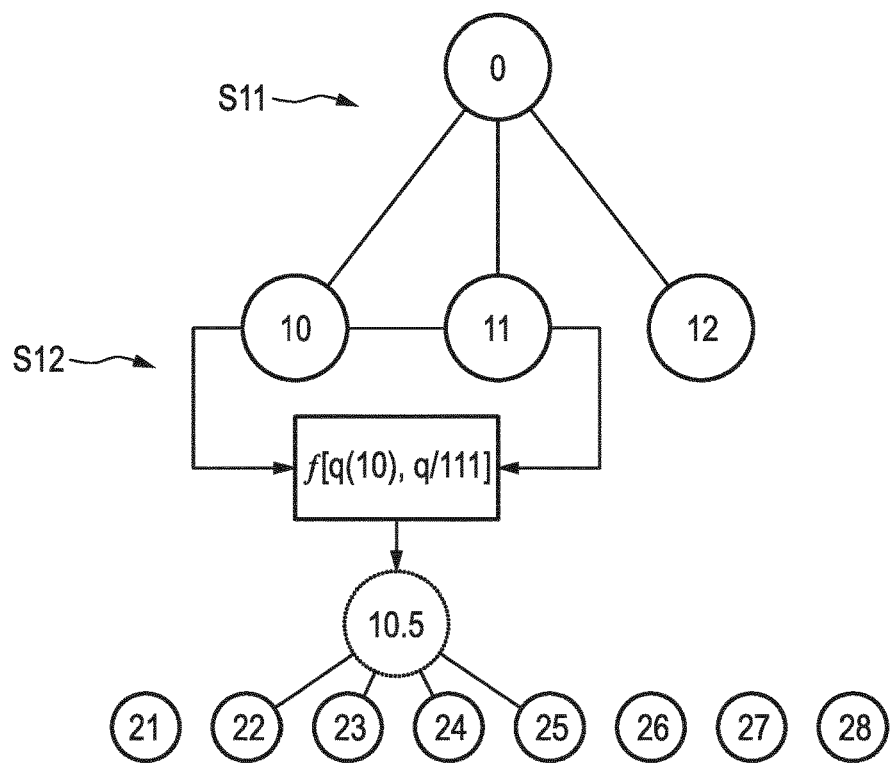
FIG. 3 shows a dynamic codebook tree according to the present disclosure.

In this case the nodes in the codebook tree, as illustrated in FIG. 3, are no longer connected statically for the complete procedure but these connections are derived from an evaluation of a predetermined metric obtained for the first beams in the first stage, e.g. from beam quality information $q(\bullet)$ that has been collected during the ongoing beam training procedure by some function $f(\bullet)$ of this predetermined metric, e.g. from quality information metrics. The result of the function does not necessarily have an interpretation such as a specific direction or beam. Any mapping from quality information metrics from coarse stage to finer sectors for subsequent search is possible.

FIG. 3 particularly illustrates an exemplary codebook tree according to the present disclosure right after the sectors 10 to 12 have been tested. Both best sectors (signal quality $q(\bullet)$ of sectors 10 and 11) are used by the function $f(\bullet)$ to derive a "virtual" best sector (10.5) that has not been tested (since non-existent as potential sector).

Figure 4A:
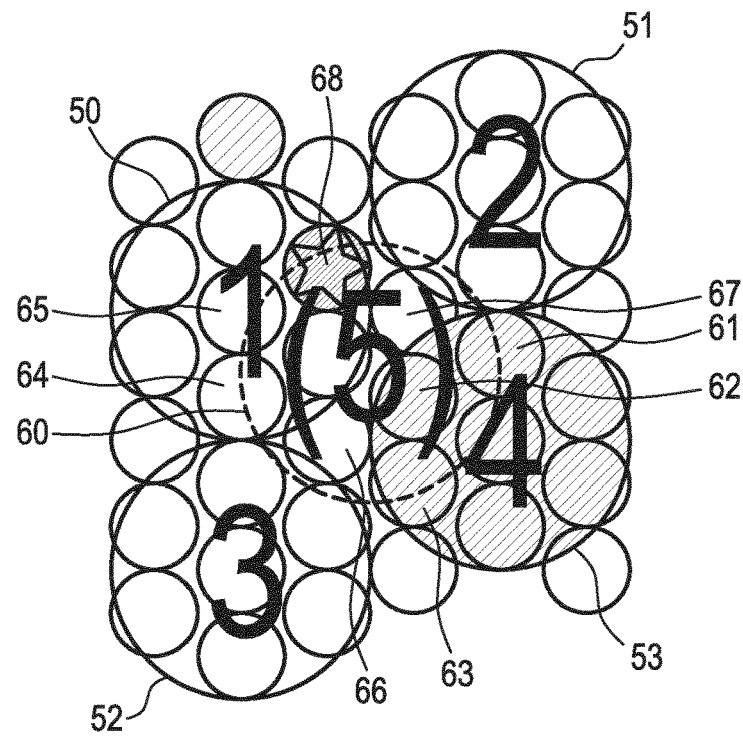
FIGS. 4A and 4B show exemplary illustrations of a virtual sectors used for training in two subsequent stages of a dynamic codebook tree according to the present disclosure.

This is illustrated in FIG. 4A showing the introduction of a virtual sector 5, indicated by reference sign 60, derived by the best coarse sectors 1 (indicated by reference sign 50) and 4 (indicated by reference sign 53) in the first stage S11 (see FIG. 3), which both appear to be equally good (indicated by color toning). The coarse sectors 2 and 3 (indicated by reference signs 51, 52) have a lower quality (in generally a worse metric used for this evaluation) so that no finer sectors below these coarse sectors will generally be tested in the second stage S12. The finer sectors 61, 62, 63 below sector 4 (53) and the virtual sector 5 (60), that have been tested in the second stage S12, are all of medium quality, while among the sectors 64, 65, 68 below sector 1 (50) and the virtual sector 5 (60), that have been tested in the second stage S12, there are many bad sectors 64, 65 and one very good sector 68. The finer sectors 66, 67 are generally not tested since they are only below the virtual sector 5 (60), but not below the best coarse sector 4 (53) from the first stage S11. In an embodiment, however, also these finer sectors 66, 67 may be tested.

Figure 4B:
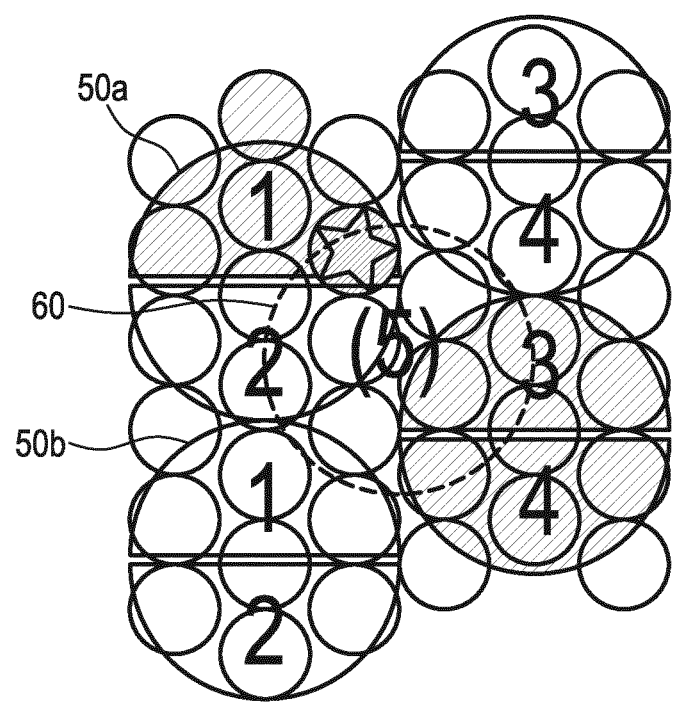

FIG. 4B shows another illustration of an exemplary virtual sector used for training in two subsequent stages of a dynamic codebook tree according to the present disclosure. This illustration is similar as the illustration in FIG. 4A, but here the coarse sectors used in the first stage S11 are not formed as contiguous sectors, but as two (or more) subsectors, i.e. a coarse sector comprises two or more finer sector that may or may not be contiguous. In other words, the sensitivity region of a coarse beam is split up into several sensitivity sub-regions. For instance, the coarse beam 1 in this example comprises two subsectors (or finer beams) 50a, 50b. The same holds in this example for the other coarse beams 2 to 4. In the same manner, the virtual sector 5 (60) may also be formed by non-contiguous subsector, which is not shown in FIG. 4B, however.

As the entries of each codebook stage are only a subset of all possible beam directions, there is no guarantee that a coarse sector, ranked with the best beam quality score (or, more generally, the best metric) will lead to the absolute best beam (of the finest codebook) when descending into the direction of this beam during further rounds. This special case is illustrated in FIGS. 4A and 4B. In order to fine-tune the applied algorithm as described above, there are at least two parameters that can be varied.

A first factor that can be varied is the maximum number of coarse beams $n_{coarse,max}$ that are taken into account to derive the "virtual" best beams (50, 53, i.e. coarse beams 1 and 4 in FIG. 4A) that are used as input values to derive the virtual sector 60. In this example it holds $n_{coarse,max}=2$.

A second factor that can be varied is the maximum spatial (Euclidian) or angular distance $d_{max}$ of fine beams tested in the second stage to the center of the (virtual) coarse beam, which can also be expressed in maximum number of neighbors in between the center beam and the distant beam or alternative relations like overlap, etc. This parameter regulates the number of interconnections from the selected coarse codebook entry to the subset of the next finer codebook. In the example visualized in FIG. 4A the maximum distance $d_{max}$ is equal to the angular distance measured between the center of sector 60 and sector 61, so all directly adjacent finer beams 61-68 to the center of the virtual best sector 60 are chosen to belong to the subset of the next finer codebook, i.e. are used for beamforming training in the second stage.

Nevertheless the procedure needs further restrictions to cover the case if the best coarse beams $n_{coarse,max}$ are not direct neighbors. Then the interpolation or averaging or weighted averaging applied directly on the best coarse beams would lead to faulty results. To avoid this behavior multiple approaches are possible: According to a first approach the set of best coarse beams can be reduced to beams that fulfil the neighborhood property that is e.g. defined as a threshold value for the (Euclidian) distance between the centers of two beams, thus only treating a single contiguous area of beams rated with good metric. According to a second approach the interpolation procedure can be performed on clusters of adjacent beams in separate then leading to a non-continuous or multiple subsets of finer beams.

To show a beamforming training framework within which the proposed techniques can be performed the training flow for a hybrid MIMO Link may be considered. In the first stage, commonly referred to as Sector Level Sweep (SLS), the beam training procedure is performed with an Initiator sweeping through transmit beams and a Responder listening with an (quasi) omni-directional antenna pattern until all beams have been tested). Then the procedure is executed vice versa with Responder sending training sequences directive and Initiator listening (quasi) omni-directional.

In a second stage (beam refinement phase, BRP) of beam training is performed. During this stage Initiator and Responder test their beam candidates selected from the SISO training jointly on multiple PAAs and on Initiator and Responder side at the same time to select the best beam combination maximizing a MIMO metric (e.g. MIMO-Capacity or Signal-to Interference-Noise-Ratio (SINR)). This means training sequences are sent directive and are received directive as well (beam-to-beam).

According to an embodiment of the present disclosure it is proposed to perform such a beam-to-beam refinement when traversing through different levels of a codebook-tree already in the SLS stage. This refinement phase can be executed after each round is completed (all beams with a certain beam width have been tested) to improve decisions for subsequent stages.

As described herein, each stage of a search tree represents potential training sectors with individual beam widths, e.g. decreasing beam width for lower levels of the tree. As previously described, a natural order to progress through this tree is from top to down, i.e., step-wise refining the beam width. However, there may be cases, where it is beneficial to allow going in the opposite direction. For instance, according to an embodiment, if during the search on a lower level (using a fine beam width), no further improvement of a particular metric (such as capacity, . . . ) is being recognized, the algorithm may step back to a coarser beam width, e.g. the second best from the previous stage(s) or third best (and so on), and start a refined search in these alternative coarse sector leaves.

The variable beam width training procedures described above may require an exhaustive search to be performed for each level of the codebook tree. In the following an embodiment will be described to terminate the exhaustive search procedure without testing all beams exhaustively and respectively reduce the execution time of the beam training procedure.

The general concept relies on the fact that when performing beam training with multiple beam widths there is always some a-priori information about the distribution of beam quality scores from previous stages (except from the very first stage), that can be used to reduce the number of beams to be tested and thus reduce complexity of the beam training procedure.

Let $\varphi = \varphi_{i,BW}$ be the beam width of the i-ith codebook stage and $\mu(u, \varphi)$ the beam quality score value for a beam with index u and beam width $\varphi$. Each codebook level consists of $U_i$ beams. For the first codebook tree level (i=1), there is usually no a-priori knowledge that can be used. Nevertheless knowledge from previous beam training procedures or a certain default set might be used. For all following levels (i>1) the beam quality score of the best beam $u_{i,max}$ of the previous level (see equation (1) below), can be used in liaison with a certain threshold ratio $r_{th}$ to define a stop condition, see equation (2) (e.g. if cumulative sum over observed beam quality scores reaches a certain threshold):

$$u_{i,max} = \arg \max_u \{\mu(u, \varphi_{i,BW})\} \quad (1)$$

$$\mu(u_{i-1,max}, \varphi_{i-1,BW}) \cdot r_{th} \geq \sum_i \mu(i, \varphi_{i,BW}) \quad (2)$$

with i: indices of all tested beams in this round.

Figure 5:
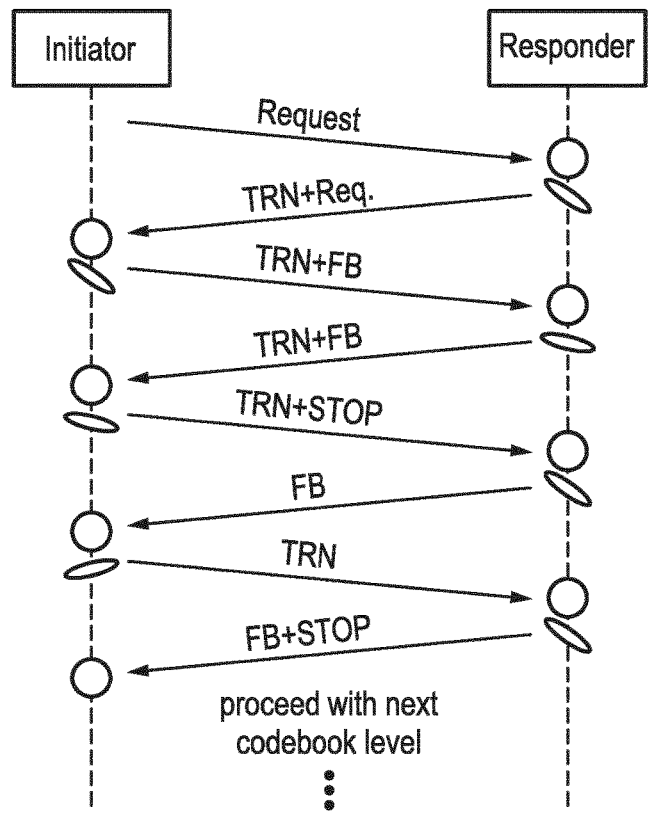
FIG. 5 shows a diagram illustrating a beam training procedure for a SISO system according to the present disclosure.

The proposed procedure requires instant feedback (FB) of beam quality scores for all tested beams in order to check after each tested beam if the early termination criterion is fulfilled. To minimize this signaling overhead, it is proposed in an embodiment to append feedback information directly to the training packets (TPs), BRP frames or training sequences (TRNs) that are sent by the Responder while testing different beams. This allows to perform beam training procedure in a more efficient way by modifying the procedure as follows (using TRNs as non-limiting example):
1. SISO-Case: The beam training procedure is done in an alternating manner. To each transmitted TRN sequence feedback information of a previously tested beam in opposite direction is appended. This is illustrated in FIG. 5 showing instant feedback from Initiator to Responder and vice versa, after each tested beam. The TRN sequences are followed by feedback information immediately. This "ping-pong" style procedure is followed until a certain stop condition is met on one side. Then the remaining TRN sequences are sent without feedback information.

Figure 6:
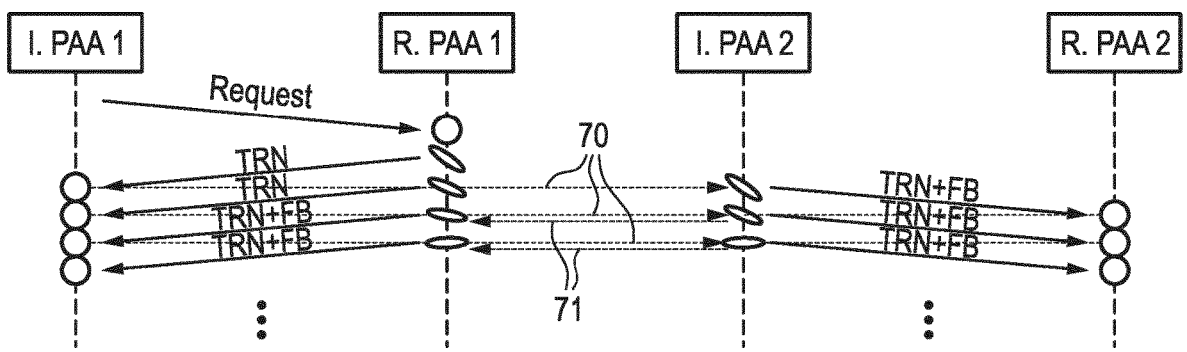
FIG. 6 shows a diagram illustrating a beam training procedure for a MIMO system according to the present disclosure.

2. MIMO-Case: Two links are trained in parallel and use orthogonal link as feedback channel. This is illustrated in FIG. 6 showing instant feedback in case of a MIMO training. As soon as feedback information is available for a beam from Responder PAA1 to Initiator PAA1 the FB information (arrows 70) is appended to a TRN sequence transmitted from Initiator PAA2 to Responder PAA2. Same holds for the opposite link, indicated by arrows 71.

The beam training methods based on a dynamic codebook tree is propagated only in a single direction. As a consequence a wrong decision in an early level of the tree (using coarse beams) would propagate through the whole procedure and ends up in a suboptimal beam selection. The reason is, that at each level of the codebook tree a decision is made, that decides for a single branch of the tree exclusively. All other branches are then ignored subsequently. To further improve the disclosed approach it is proposed in an embodiment to allow the beam training algorithm to step back and forth between the different levels of the codebook tree by internally keeping a list of metrics for all measured beams. Based on this list the algorithm decides which beams (independent of the codebook tree level) to test next. This list may comprise different metrics depending on the use case. Suitable candidates include, but are not limited to Signal-to-Noise-Ratio (SNR), Signal-to-Interference-Noise-Ratio (SINR), channel capacity, delay spread, received signal strength (RSSI), etc.

Some of these metrics may be normalized prior usage within the list as they naturally depend on the beam width of the beam that was used to measure the respective channel. For example, the received signal power naturally increases when using more narrow beams. Hence, this metric may be normalized to received signal power density to be usable as an indicator over different beam widths.

Figure 7:
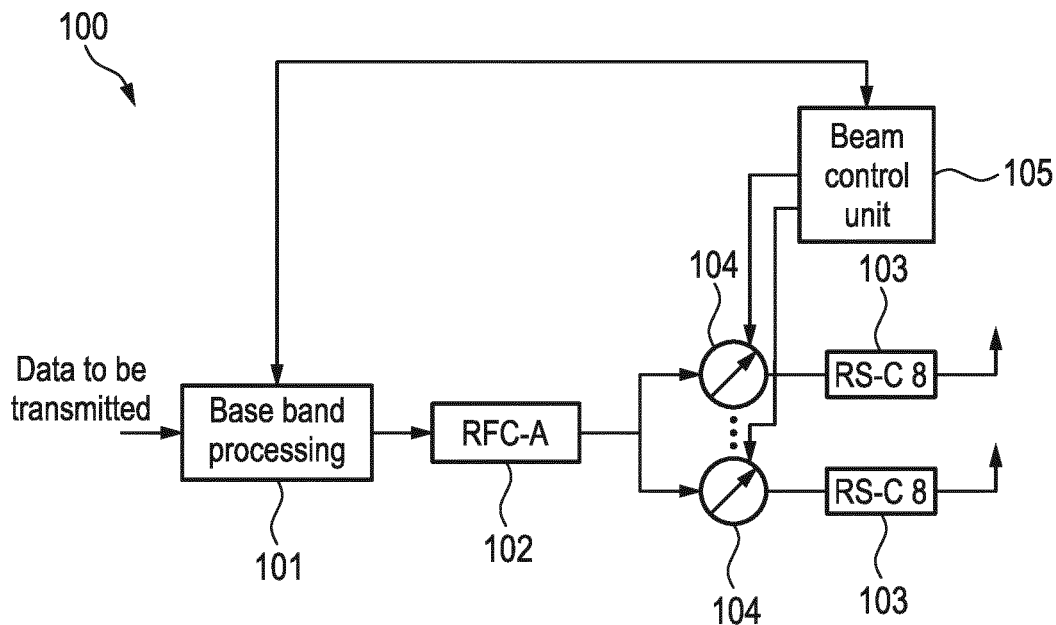
FIG. 7 shows a schematic diagram of an embodiment of an analog beamforming arrangement as it is typically applied in mm-wave systems.
Figure 8:
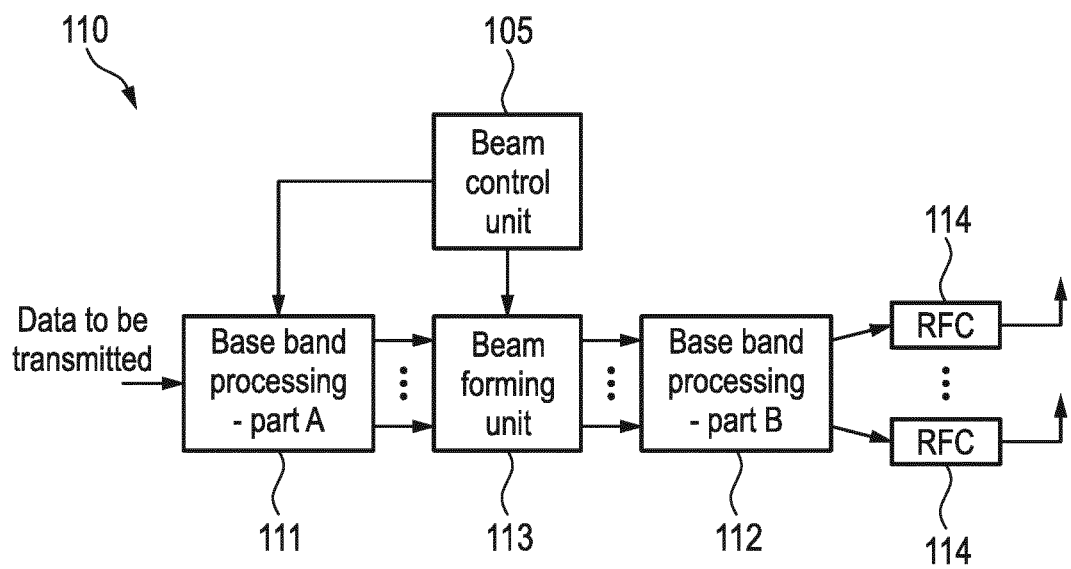
FIG. 8 shows a schematic diagram of an embodiment of a digital beamforming arrangement as typically applied in MIMO communication systems operating well below 60 GHz.

In general, the following embodiments of beamforming architectures shown in FIGS. 7 and 8 may be applied for beamforming in the context of the present disclosure. FIG. 7 shows a typical mm-wave transmitter architecture 100, where beamforming is performed in analog domain. Input data is processed in baseband processing unit 101 (e.g. including an encoder, a modulator, etc.) and allocated to an RF chain (RFC). The RFC is divided in part A (RFC-A 102), which holds DAC, filtering, and frequency up-converter, and part B (RFC-B 103), which holds a power amplifier, respectively. The number of RFC-A elements 102 corresponds to the number of antenna arrays (one in FIG. 7). A controllable phase shifter 104 is located between RFC-A 102 and each RFC-B 103. The phase shifters 104 are controlled by a beam control unit 105 such that directive beams can be formed by the antenna array(s). The number of phase shifters 104 and RFC-B elements 103 corresponds to the number of antenna elements in the associated antenna array.

In contrast, FIG. 8 shows a regular multi-antenna transmitter architecture 110, where digital beamforming is performed. Two baseband processing units 111, 112 are provided, one before and one after the beamforming unit 113. Each transmit antenna features a full RFC 114. Beamforming is performed in digital domain and is done such that an ensemble of transmit antennas can form directive beams.

The receivers have a similar setup as the transmitters but perform inverse operations. Beamforming at the receiver side is done in a similar way as at the transmitter so that several receive beams can be selected. To summarize, different beamforming architectures can generate several directive beams or sectors at transmitter side and/or receiver side, which can be controlled.

In state of the art approaches for analog beamforming in mmWave WLAN standards, each PAA is applying its most narrow antenna gain pattern. These gain patterns can be achieved by setting the phase shifters connected to each sub antenna in a linear fashion. For a uniform linear antenna array (ULA) the following expression for the antenna weight vector W holds, with N the number of antenna elements, d antenna spacing and $\vartheta_{max}$ angular direction of the resulting beams main lobe and wavelength $\lambda$:

$$W(n) = \exp\{-j \cdot a_0 \cdot n\} \text{ with } a_0 = \sin(\vartheta_{max}) \cdot \frac{2\pi}{\lambda} \cdot d$$

with $n \in \{0, \ldots, N\}$.

This relation can easily be expanded to two-dimensional antenna arrays. Proposed solutions for less complex beam training algorithms all rely on the ability to form beams of variable width from a single PAA. In an embodiment it is proposed to use one or a combination of the following approaches:

1. Dynamically passivate and activate certain sub antennas to influence the PAA configuration and thus influence the PAAs effective beam width.
2. Application of AWVs that do form multiple narrow beams that then mutually cover a wider sector than a single narrow beam while still using all available sub antenna elements.
3. Usage of optimized non-linear antenna weight vectors that form wider beams while driving all available antenna elements.

These approaches are described in more detail in the following.

With the goal to get a PAA featuring configurable beam width, one possible solution is to make antenna elements used to receive and transmit RF signals switchable. From relations in equations (3) and (4) it can be seen that the number of used antenna elements N defines the achievable beam width of the respective antenna.

$$HPBW_{DEG} \sim \frac{1}{N} \qquad (3)$$

$$g_{dB} \approx 10\log_{10}(N) \qquad (4)$$

Figure 9:
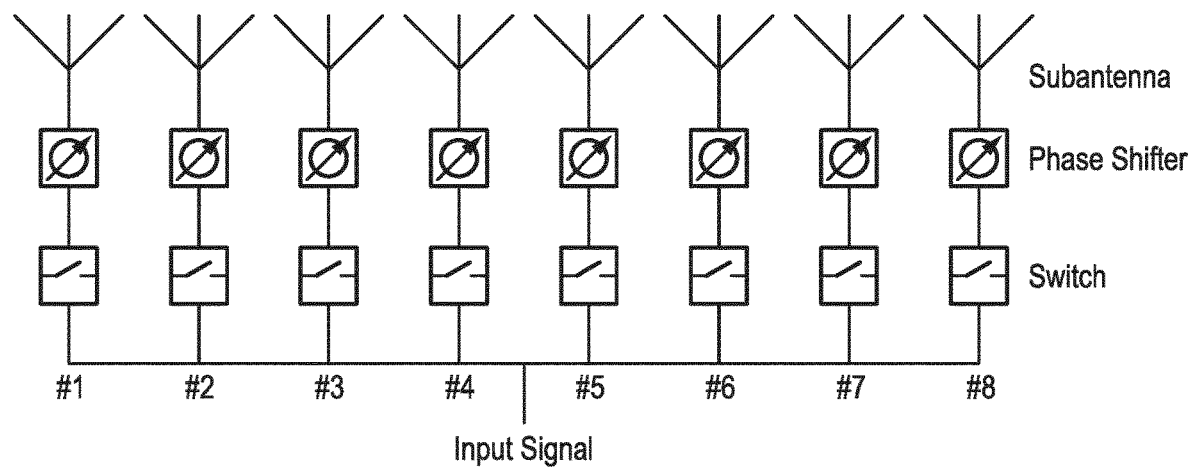
FIG. 9 shows a schematic diagram of a uniform linear antenna array to make the PAA's beam width configurable.

By placing switches or switchable power amplifiers in the feeding path of the respective antenna elements, the configuration of a uniform linear antenna array (ULA) can be configured dynamically to achieve different beam widths. This concept is visualized in FIG. 9 and can easily be adopted to two-dimensional antenna arrays.

Because an antenna's far field radiation pattern corresponds to the Fourier transform of the antennas aperture, there can be a systematic approach derived to form wider beams. To form the narrowest beam a PAA can form in broad side direction $\varphi_0=0°$, the inverse Fourier Transform (FT) of a Dirac-pulse $\delta(\varphi-\varphi_0)$ may be applied on the complex amplitude values $\alpha(x)$ that drive the PAAs sub antenna elements (see equation (5)):

$$\alpha(x) = IFT(\delta(\varphi)) = \text{const.} \qquad (5)$$

Respectively to form a wider beam with width $\varphi_W$, the inverse FT of a rect-window may be applied on the sub antenna elements' amplitudes.

$$\mathrm{sinc}\left(\frac{\varphi_W \cdot x}{2}\right)\frac{\varphi_W}{2\pi} = IFT\left\{rect\left(\frac{\varphi}{\varphi_W}\right)\right\} = \alpha(x)$$

It is proposed in an embodiment to approximate these "sin c"-shaped amplitude values by respectively switching "off" antenna elements below a certain threshold value and switching "on" all sub antenna elements above the threshold. This method allows to generate beams with adjustable beam width and can be applied for different constraints e.g. if there are only switches available to adjust sub antenna amplitudes.

A different approach to profit from dynamic PAA configurations is to dynamically split the PAA into variable sets of sub antennas (e.g. #1, #4, #5, #8 are switched on, while #2, #3, #6, #7 are switched off, or vice versa). This would lead to a variable sub antenna spacing, i.e. distance between #1 and #4 is $$\frac{3\lambda}{2}$$

and distance between #4 and #5 is $$\frac{\lambda}{2}.$$

These variable subsets can also applied to two-dimensional antenna arrays, where additionally diagonal antenna spacing can be exploited to influence antenna gain patterns. Due to the fact that $$\frac{\lambda}{2}$$

is the optimal antenna spacing for coupling in order to form narrow beams, the use of variable distance arrangements can decrease the coupling of the signals in such a way that wider beams can be formed.

Additionally, in Hybrid-MIMO configurations different signals can be assigned to distinct antenna configurations, e.g. use the subset {#1, #4, #5, #8} to transmit a signal $S_1(t)$ with a horizontal polarization in a specific direction while the subset {#2, #3, #6, #7} is used to transmit another signal $S_2(t)$ with a vertical polarization in another direction and therefore scan spherical half-space simultaneously.

Figure 10:
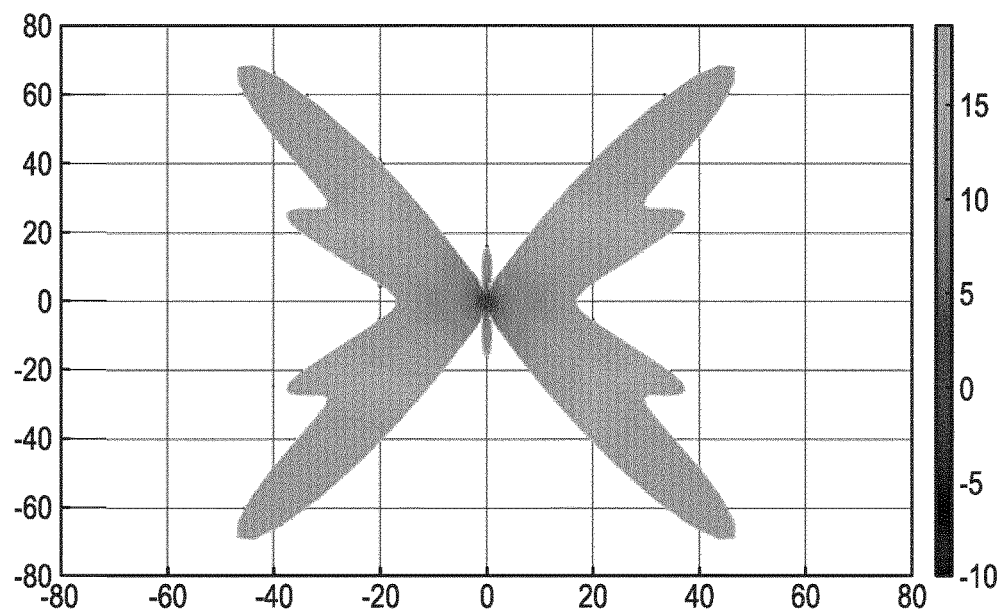
FIG. 10 shows multiple beams steered from a single PAA by using two independent linear phase shifter settings on left and right half number of antenna elements.

Another embodiment does not result in wider beams as described above directly, but allows forming multiple beams that in total cover a wider sector than with regular linear phase shifter settings. The concept requires splitting up a single antenna array into multiple equally sized antenna arrays that each use a linear antenna weight vector to form beams in different spatial directions. This is illustrated in FIG. 10 showing multiple beams steered from a single PAA by using two independent linear phase shifter settings on left and right half number of antenna elements.

A third option to form wider beams is to employ non-linear antenna weight vectors that are designed in a way that the resulting antenna gain pattern shows a wider half power beam width than the corresponding linear AWV.

The present disclosure is well suited to be adopted by further IEEE802.11ay products because it fits the proposed architecture for the future IEEE802.11ay standard in which arrays of subarrays are employed and it requires only slight modifications to the IEEE802.11ad frame structures and beamforming/training procedures, which is a desired feature for the upcoming IEEE802.11ay standard.

Further, first simulations showed that using a variable beam width training algorithm in the first of two IEEE802.11ay beam training stages can reduce complexity by approx. 50% while maintaining comparable performance over exhaustive search method.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. A communication device for RF-based communication with another communication device, said communication device comprising:

antenna circuitry configured to transmit and receive RF signals, and beamforming circuitry configured to perform beamforming and to carry out a beam training procedure for finding a beam for use in transmitting and/or receiving RF signals and/or for channel estimation, said beamforming training procedure comprising at least two stages during which training signals are transmitted using different beams, wherein first beams used in a first stage have a larger beam sector than second beams used in a second stage and wherein the second beams are selected by forming a virtual best sector based on an evaluation of a predetermined metric obtained for the first beams in the first stage.

2. The communication device as defined in embodiment 1, wherein the beamforming circuitry is configured to form the virtual best sector by selecting the two or more best first beams in terms of the evaluated predetermined metric obtained for the first beams in the first stage.

3. The communication device as defined in embodiment 2, wherein the beamforming circuitry is configured to form the virtual best sector by applying a function on the values of the predetermined metric obtained for the selected two or more best first beams, in particular by applying an averaging function, a weighted averaging function, an interpolation function or an extrapolation function.

4. The communication device as defined in embodiment 1, wherein the predetermined metric is a signal quality measure, in particular one or more of signal-to-noise ratio, signal-to-interference-noise ratio, channel capacity, delay spread, received signal strength.

5. The communication device as defined in embodiment 1, wherein the beamforming circuitry is configured to form the virtual best sector using the number of first beams.

6. The communication device as defined in embodiment 1, wherein the beamforming circuitry is configured to form the virtual best sector using the beam width of the first beams, in particular to have the same beam width or a beam width that is smaller or larger, or by selecting second beams that belong to the intersection between the angular set covered by the virtual sector and that corresponding to at least one of the first beams.

7. The communication device as defined in embodiment 1, wherein the beamforming circuitry is configured to form the virtual best sector using the maximum distance from the center of the virtual best beam, up to which second beams are used in the second stage.

8. The communication device as defined in embodiment 1, wherein the beamforming circuitry is configured to set the beam width or sensitivity region of the virtual best sector to be identical to the beam width or sensitivity region of the first beams.

9. The communication device as defined in embodiment 1, wherein the beamforming circuitry is configured to form the virtual best sector as a single contiguous beam or as two or more non-contiguous sub-beams.

10. The communication device as defined in embodiment 1, wherein the beamforming circuitry is configured to form the virtual best sector by selecting the best two or more adjacent or nearby first beams in terms of the evaluated predetermined metric obtained for the first beams in the first stage.

11. The communication device as defined in embodiment 1 or 10, wherein the beamforming circuitry is configured to form the virtual best sector by applying a function on the values of the predetermined metric, which have been obtained for sets of respectively adjacent best first beams in terms of the evaluated predetermined metric obtained for the first beams in the first stage, if the best first beams are not all adjacent to each other.

12. The communication device as defined in embodiment 1, wherein the beamforming circuitry is configured to form, in a third stage, a second virtual sector by selecting two or more second and/or third best first beams in terms of the evaluated predetermined metric obtained for the first beams in the first stage and to carry out beamforming training in a fourth stage using second beams covered by the second virtual best sector, if no improvement or only an improvement below a threshold in terms of the evaluated predetermined metric is achieved in the second stage compared to the first stage of if the finest possible sector width is not reached.

13. The communication device as defined in embodiment 1, wherein the antenna circuitry comprises a single antenna or antenna array and is configured for SISO communication and for alternately transmitting training signals and listening for training signals transmitted by the other communication device, wherein directive beams are used for transmitting training signals and omni-directional beams are used for listening.

14. The communication device as defined in embodiment 1, wherein the antenna circuitry comprises two or more antennas or antenna arrays and is configured for MIMO or MISO communication, wherein a first antenna or antenna array is transmitting training signals using directive beams while a second antenna or antenna array is listening for training signals transmitted by the other communication device using omni-directional beams.

15. The communication device as defined in embodiment 1, wherein the beamforming circuitry is configured to include or append feedback information to training signals, said feedback information including information about the predetermined metric for one or more training signals received from the other communication device, and/or for receiving feedback information from the other communication device.

16. The communication device as defined in embodiment 5, wherein the antenna circuitry is configured to receive said signal quality measure from the other communication device.

17. The communication device as defined in embodiment 1, wherein the beamforming circuitry is configured to record the values of the predetermined metric for the beams used for transmitting training signals and to use the recorded values for forming the virtual best sector and/or for selecting beams for forming the virtual best sector.

18. A communication method for RF-based communication with another communication device, said communication method comprising:
performing beamforming and
carrying out a beam training procedure for finding a beam for use in transmitting and/or receiving RF signals and/or for channel estimation, said beamforming training procedure comprising at least two stages during which training signals are transmitted using different beams, wherein first beams used in a first stage have a larger beam sector than second beams used in a second stage and wherein the second beams are selected by forming a virtual best sector based on an evaluation of a predetermined metric obtained for the first beams in the first stage.

19. A non-transitory computer-readable recording medium that stores therein a computer program product, which, when executed by a processor, causes the method according to embodiment 18 to be performed.

20. A computer program comprising program code means for causing a computer to perform the steps of said method according to embodiment 18 when said computer program is carried out on a computer.

The invention claimed is:

1. A communication device for RF-based communication with another communication device, said communication device comprising:
    antenna circuitry configured to transmit and receive RF signals, and
    beamforming circuitry configured to perform beamforming and to carry out a beam training procedure for finding a beam for use in transmitting and/or receiving RF signals and/or for channel estimation, said beamforming training procedure comprising at least two stages during which training signals are transmitted using different beams, wherein first beams used in a first stage have a larger beam sector than second beams used in a second stage and wherein the second beams are selected by forming a virtual best sector based on an evaluation of a predetermined metric obtained for the first beams in the first stage.

2. The communication device as claimed in claim 1, wherein the beamforming circuitry is configured to form the virtual best sector by selecting the two or more best first beams in terms of the evaluated predetermined metric obtained for the first beams in the first stage.

3. The communication device as claimed in claim 2, wherein the beamforming circuitry is configured to form the virtual best sector by applying a function on the values of the predetermined metric obtained for the selected two or more best first beams, in particular by applying an averaging function, a weighted averaging function, an interpolation function or an extrapolation function.

4. The communication device as claimed in claim 1, wherein the predetermined metric is a signal quality measure, in particular one or more of signal-to-noise ratio, signal-to-interference-noise ratio, channel capacity, delay spread, received signal strength.

5. The communication device as claimed in claim 1, wherein the beamforming circuitry is configured to form the virtual best sector using the number of first beams.

6. The communication device as claimed in claim 1, wherein the beamforming circuitry is configured to form the virtual best sector using the beam width of the first beams, in particular to have the same beam width or a beam width that is smaller or larger, or by selecting second beams that belong to the intersection between the angular set covered by the virtual sector and that corresponding to at least one of the first beams.

7. The communication device as claimed in claim 1, wherein the beamforming circuitry is configured to form the virtual best sector using the maximum distance from the center of the virtual best beam, up to which second beams are used in the second stage.

8. The communication device as claimed in claim 1, wherein the beamforming circuitry is configured to set the beam width or sensitivity region of the virtual best sector to be identical to the beam width or sensitivity region of the first beams.

9. The communication device as claimed in claim 1, wherein the beamforming circuitry is configured to form the virtual best sector as a single contiguous beam or as two or more non-contiguous sub-beams.

10. The communication device as claimed in claim 1, wherein the beamforming circuitry is configured to form the virtual best sector by selecting the best two or more adjacent or nearby first beams in terms of the evaluated predetermined metric obtained for the first beams in the first stage.

11. The communication device as claimed in claim 1, wherein the beamforming circuitry is configured to form the virtual best sector by applying a function on the values of the predetermined metric, which have been obtained for sets of respectively adjacent best first beams in terms of the evaluated predetermined metric obtained for the first beams in the first stage, if the best first beams are not all adjacent to each other.

12. The communication device as claimed in claim 1, wherein the beamforming circuitry is configured to form, in a third stage, a second virtual sector by selecting two or more second and/or third best first beams in terms of the evaluated predetermined metric obtained for the first beams in the first stage and to carry out beamforming training in a fourth stage using second beams covered by the second virtual best sector, if no improvement or only an improvement below a threshold in terms of the evaluated predetermined metric is achieved in the second stage compared to the first stage of if the finest possible sector width is not reached.

13. The communication device as claimed in claim 1, wherein the antenna circuitry comprises a single antenna or antenna array and is configured for SISO communication and for alternately transmitting training signals and listening for training signals transmitted by the other communication device, wherein directive beams are used for transmitting training signals and omni-directional beams are used for listening.

14. The communication device as claimed in claim 1, wherein the antenna circuitry comprises two or more antennas or antenna arrays and is configured for MIMO or MISO communication, wherein a first antenna or antenna array is transmitting training signals using directive beams while a second antenna or antenna array is listening for training signals transmitted by the other communication device using omni-directional beams.

15. The communication device as claimed in claim 1, wherein the beamforming circuitry is configured to include or append feedback information to training signals, said feedback information including information about the predetermined metric for one or more training signals received from the other communication device, and/or for receiving feedback information from the other communication device.

16. The communication device as claimed in claim 5, wherein the antenna circuitry is configured to receive said signal quality measure from the other communication device.

17. The communication device as claimed in claim 1, wherein the beamforming circuitry is configured to record the values of the predetermined metric for the beams used for transmitting training signals and to use the recorded values for forming the virtual best sector and/or for selecting beams for forming the virtual best sector.

18. A communication method for RF-based communication with another communication device, said communication method comprising:
    performing beamforming and
    carrying out a beam training procedure for finding a beam for use in transmitting and/or receiving RF signals and/or for channel estimation, said beamforming training procedure comprising at least two stages during which training signals are transmitted using different beams, wherein first beams used in a first stage have a larger beam sector than second beams used in a second stage and wherein the second beams are selected by forming a virtual best sector based on an evaluation of a predetermined metric obtained for the first beams in the first stage.

19. A non-transitory computer-readable recording medium that stores therein a computer program product, which, when executed by a processor, causes the method according to claim 18 to be performed.

* * * * *